(12) United States Patent
Eichelhard et al.

(10) Patent No.: US 8,696,003 B2
(45) Date of Patent: Apr. 15, 2014

(54) FRONT AXLE SUPPORT WITH ARRANGEMENT OF A STEERING GEAR AND A FRONT AXLE STABILIZER

(75) Inventors: Oliver Eichelhard, Frankfurt (DE); Lutz Uhlenbruch, Herbstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 13/276,633

(22) Filed: Oct. 19, 2011

(65) Prior Publication Data

US 2012/0091680 A1 Apr. 19, 2012

(51) Int. Cl.
*B62D 7/00* (2006.01)

(52) U.S. Cl.
USPC ............ 280/124.109; 280/93.515; 280/89.12; 280/124.152

(58) Field of Classification Search
USPC ............. 280/89.12, 93.502, 93.515, 124.106, 280/124.113, 771, 124.152, 124.109, 788
See application file for complete search history.

(56) References Cited

U.S. PATENT DOCUMENTS

| | | | | |
|---|---|---|---|---|
| 3,864,989 | A | * | 2/1975 | Jones ............................... 74/498 |
| 5,707,074 | A | * | 1/1998 | Kobayashi ............. 280/124.166 |
| 5,879,026 | A | * | 3/1999 | Dostert et al. ................. 280/781 |
| 5,918,893 | A | | 7/1999 | Marquardt et al. |
| 5,997,038 | A | * | 12/1999 | Dostert et al. ................. 280/781 |
| 6,085,856 | A | * | 7/2000 | Law et al. ...................... 180/291 |
| 7,946,602 | B2 | * | 5/2011 | Shimatani et al. ..... 280/124.152 |
| 8,403,347 | B2 | * | 3/2013 | Eickmann et al. ..... 280/124.109 |
| 2002/0153687 | A1 | * | 10/2002 | Howard .......................... 280/90 |
| 2004/0239020 | A1 | * | 12/2004 | Ito ............................. 267/140.12 |
| 2005/0051987 | A1 | * | 3/2005 | Saitoh et al. ........... 280/124.134 |
| 2006/0043690 | A1 | * | 3/2006 | Pankau ..................... 280/93.502 |
| 2006/0163834 | A1 | * | 7/2006 | Brereton et al. ........ 280/124.128 |
| 2009/0008889 | A1 | * | 1/2009 | Jargowsky et al. ...... 280/93.512 |
| 2009/0051154 | A1 | | 2/2009 | Eickmann et al. |
| 2009/0066048 | A1 | * | 3/2009 | Mayenburg et al. ..... 280/124.11 |
| 2009/0160155 | A1 | * | 6/2009 | Shimatami et al. .... 280/124.152 |
| 2009/0288297 | A1 | * | 11/2009 | Schmidt et al. .......... 29/898.052 |
| 2010/0123068 | A1 | * | 5/2010 | Ro ................................. 248/635 |
| 2010/0289240 | A1 | | 11/2010 | Buschjohann et al. |
| 2011/0127094 | A1 | * | 6/2011 | Hamada et al. ............ 180/65.51 |
| 2011/0215545 | A1 | | 9/2011 | Buschjohann et al. |
| 2012/0139204 | A1 | * | 6/2012 | Jung ..................... 280/124.106 |

FOREIGN PATENT DOCUMENTS

| | | |
|---|---|---|
| DE | 19920051 A1 | 11/2000 |
| DE | 102005044062 A1 | 5/2007 |
| DE | 102006026635 A1 | 12/2007 |
| DE | 102007012148 A1 | 9/2008 |
| DE | 102008055926 A1 | 8/2009 |
| DE | 102009043474 A1 | 5/2010 |
| DE | 102009041771 A1 | 3/2011 |
| DE | 102010025537 A1 | 5/2011 |
| EP | 0779204 A1 | 6/1997 |

(Continued)

*Primary Examiner* — Ruth Ilan
*Assistant Examiner* — Barry Gooden, Jr.
(74) *Attorney, Agent, or Firm* — Ingrassia Fisher & Lorenz, P.C.

(57) ABSTRACT

A front axle support is provided with arrangement of a steering gear and a front axle stabilizer. The front axle support has receptacles for fastening the steering gear and for fastening the front axle stabilizer with screw connections. The steering gear and the front axle stabilizer are fixed on a common fitting. The common fitting is disposed with a common screw connection on the front axle support.

11 Claims, 3 Drawing Sheets

(56) References Cited

FOREIGN PATENT DOCUMENTS

| | | | |
|---|---|---|---|
| EP | 0816139 | A2 | 1/1998 |
| FR | 2615458 | A1 | 11/1988 |
| WO | 2007031060 | A1 | 3/2007 |
| WO | 2011029677 | A1 | 3/2011 |

* cited by examiner

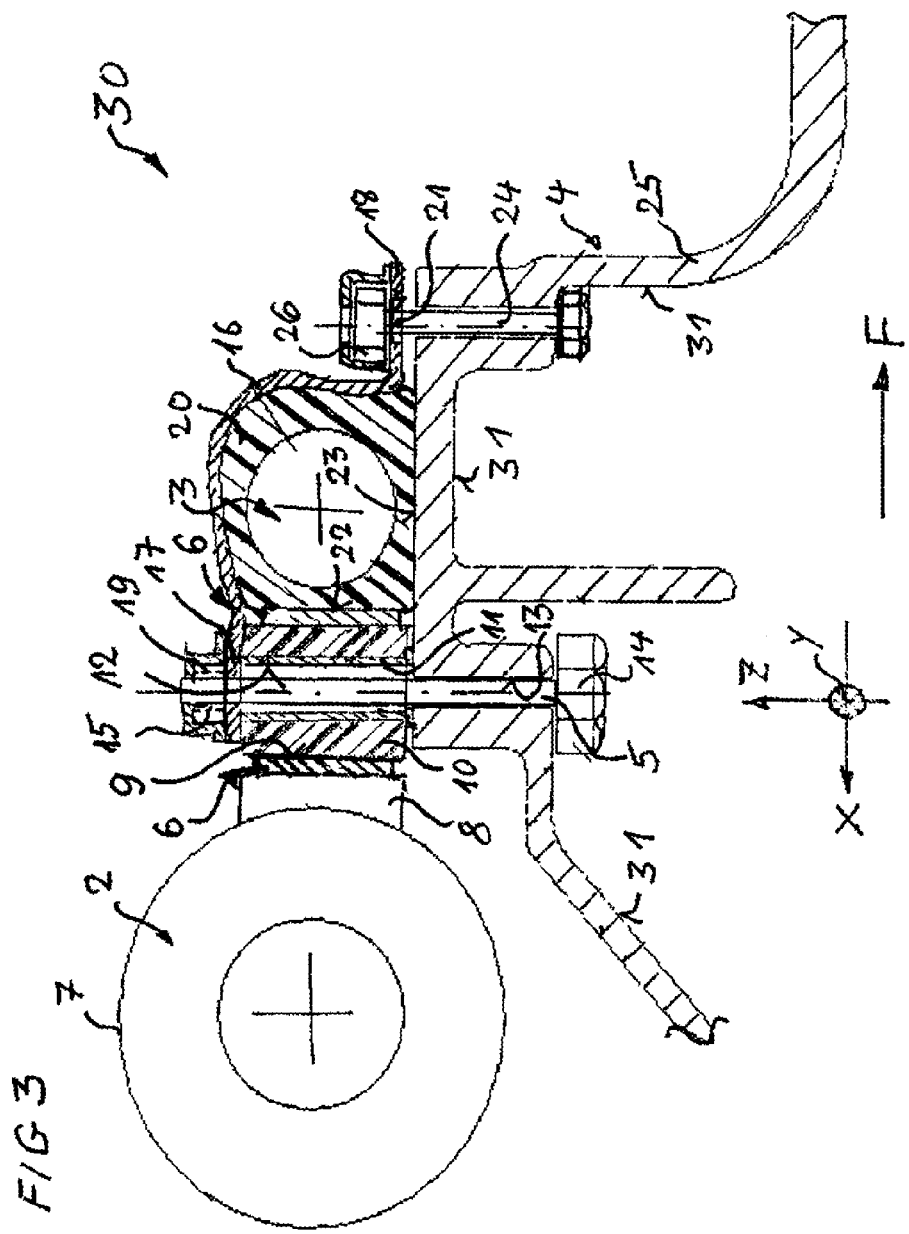

FRONT AXLE SUPPORT WITH ARRANGEMENT OF A STEERING GEAR AND A FRONT AXLE STABILIZER

CROSS-REFERENCE TO RELATED APPLICATION

This application claims priority to German Patent Application No. 102010048858.5, filed Oct. 19, 2010, which is incorporated herein by reference in its entirety.

TECHNICAL FIELD

The technical field relates to a front axle support with arrangement of a steering gear and a front axle stabilizer. The front axle support has receptacles for fastening the steering gear and for fastening the front axle stabilizer by means of screw connections.

BACKGROUND

Known from the document DE 10 2007 012 148 A1 is a front axle support on which a steering gear and a front axle stabilizer can be fixed by means of screw connections. The known front axle support has two through holes for first screw connections for fixing a steering gear and two second through holes for second screw connections for fixing a front axle stabilizer, where the two first through holes are located at a distance from one another. Constructively this results in an appreciable space requirement, which codetermines weight and size of the front axle support.

Since the known front axle support for an automobile is made of a light metal, the plurality of through holes required for receiving the fastenings of the steering gear and the front axle stabilizer either result in a weakening of the front axle support or, due to additional reinforcing measures, a corresponding increase in the weight of the front axle support with simultaneously increasing material costs. Finally, the assembly effort is also appreciable since at least four screw connections must be fixed on the front axle support in order to connect the steering gear and the front axle stabilizer mechanically to the front axle support. In addition, it should be noted that the fastenings of steering gear and front axle stabilizer have hitherto been provided at a distance from one another in order to allow sufficient freedom of assembly for attaching corresponding fixing screw connections.

It is at least one object to provide a front axle support with arrangement of a steering gear and a front axle stabilizer, where the front axle support, the steering gear, and the front axle stabilizer can be manufactured with one another with a lower assembly effort. It is furthermore the object of the application to save weight and reduce material costs. In addition, other objects, desirable features and characteristics will become apparent from the subsequent summary and detailed description, and the appended claims, taken in conjunction with the accompanying drawings and this background.

SUMMARY

In order to achieve the object, a front axle support with arrangement of a steering gear and a front axle stabilizer is proposed, where the front axle support has receptacles for fastening the steering gear and for fastening the front axle stabilizer by means of screw connections. The steering gear and the front axle stabilizer are fixed on a common fitting. The common fitting is disposed by means of a common screw connection on the front axle support.

This front axle support with arrangement of a steering gear and a front axle stabilizer has the advantage that by means of a single screw connection, the steering forces which act substantially transversely to the direction of travel on the steering gear can be intercepted by means of the common fitting and a single screw connection. Furthermore, this solution has the advantage that the combination of the hitherto separately mounted screw connections to form a single screw connection brings a cost saving which has an effect both in the assembly and in the saving of material since fewer screw connections need to be mounted and therefore fewer screw elements need to be stored and held in stock. In addition, the weight of the front axle support can be reduced, especially as merely a solid through hole needs to be provided for retaining the common fitting of steering gear and front axle stabilizer in the front axle support.

It is furthermore provided that the steering gear has a casing with a fastening flange, where the fastening flange forms the common fitting. Steering forces of the steering gear in the y-direction transverse to the direction of travel can be transmitted via this common fitting to the front axle support. Furthermore, the common fitting with the fastening flange can form a cast-on part of the casing of the steering gear. This has the advantage that the common fitting is not a separate component, which reduces storage and assembly costs.

For this purpose the fastening flange has a through opening, into which a first elastomer element is pressed. A central metal sleeve with a first through hole is disposed in the first elastomer element, which is aligned onto a second through hole in the front axle support. The elastomer element decouples the casing of the steering gear with the fastening flange from vibrations and movements of the front axle support and conversely.

Nevertheless, the elastomer element is suitable for transmitting the requisite steering forces onto the metal sleeve, which is connected positively to the front axle support whereby a stress bolt is guided through the first and second through hole. In this case, the inside diameter of the first through hole of the metal sleeve is greater than the inside diameter of the second through hole in the front axle support. This has the advantage that the metal sleeve can be supported on the front axle support and cannot slip into the second through hole.

The inside diameter of the second through hole is adapted to the outside diameter of a threaded attachment of the stress bolt. This has the advantage that the stress bolt with its threaded attachment which has a larger outside diameter than the shaft of the stress bolt, can be mounted from the underside of the front axle support firstly through the second of the two through holes and then through the first through hole.

For fixing the front axle stabilizer on the common fitting and on the upper side of the front axle support, it is provided that a clip connected detachably to the fitting partially surrounds the front axle stabilizer. To this end the clip has a first end and a second end where the first end of the clip is formed as a cover disk, which covers the larger first through hole of the metal sleeve. The fixing of the front axle stabilizer on the front axle support is thus combined with the fixing of the steering gear on the front axle support so that a stress bolt guided through the two through holes interconnects both the clip for the front axle stabilizer and also the casing of the steering gear via the common stress bolt. This can be achieved by the first end completely covering the larger first through hole of the metal sleeve so that the first end of the clip by means of the stress bolt ensures a press fit of the metal sleeve of the first elastomer with the first through hole on the front axle support via the second through hole.

It is further provided that the first end of the clip has a cage nut on the cover disk, which can engage with the stress bolt. This has the advantage that insertion of the stress bolt from the underside of the front axle support and screwing of the stress bolt with the aid of the cage nut can be simplified and no counter-key is required to bring the stress bolt and nut into engagement with one another and fix them.

It is further provided that a second elastomer element is disposed between the clip and the front axle stabilizer, which element completely surrounds the cross-section of the front axle stabilizer. This second elastomer element not only fixes the front axle stabilizer on the front axle support but also enables decoupling of vibrations which can act via the front axle stabilizer substantially as vertical forces in the z-direction on the front axle support.

At its second end the clip has a hole, by which means the second end of the clip is fixed on the front axle support via a screw connection between the second end of the clip and the front axle support. Here also it is provided that the relevant screw can be inserted from the underside of the front axle support so that it is advantageous if the second end of the clip has a cage nut which is adapted to the thread of the provided screw connection.

As a result of the fixing of the two ends of the clip, the second elastomer element of the front axle stabilizer is therefore clamped between an outer edge of the common fitting, an upper side region of the front axle support, and the clip. Due to this arrangement, the clip secures the front axle stabilizer on the front axle support against displacement by vertical forces in the z-direction.

BRIEF DESCRIPTION OF THE DRAWINGS

The present invention will hereinafter be described in conjunction with the following drawing figures, wherein like numerals denote like elements, and:

FIG. 3 shows a schematic cross-section through a front axle support with an arrangement of a steering gear and a front axle stabilizer according to a further embodiment.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
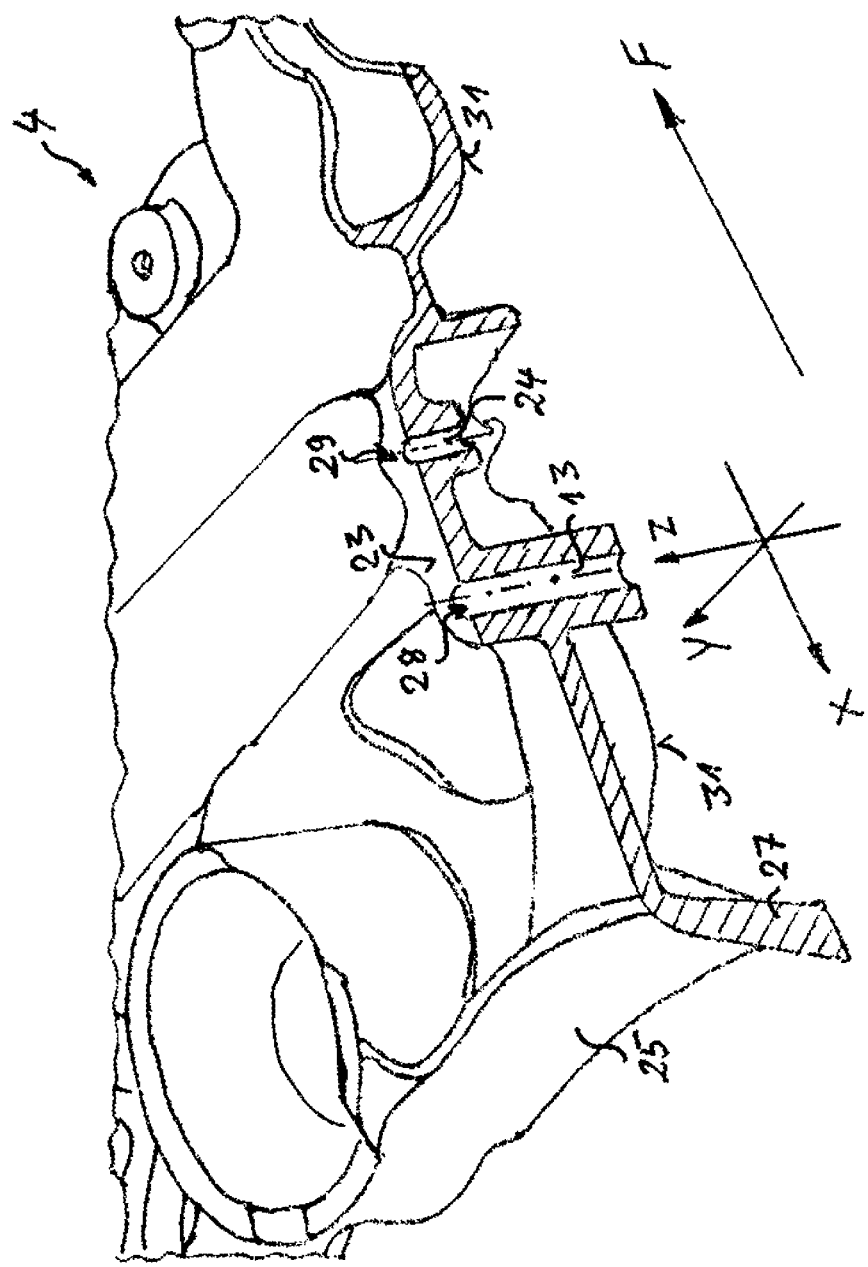
FIG. 1 shows a schematic, perspective partly cutaway view of a front axle support.

A schematic, perspective partly cutaway view of the front axle support 4 is shown in FIG. 1, where a plane of intersection 27 intersects an area in which a receptacle 28 of a steering gear and a receptacle 29 of a front axle stabilizer are disposed on the front axle support 4. The arrow F shows the direction of travel in order to define the position of the front axle support 4 in the front area of a vehicle whereas the transverse direction is shown spatially by the y axis of the axis cross shown there. The x direction is in each case opposite the direction of travel F and the z axis shows a vertical alignment.

In the receptacles 28 and 29 screw connections are provided in through holes 13 or 24 for fastening the steering gear or for fastening the front axle stabilizer, which are guided through the front axle support 4. In this case, screws of the corresponding screw connections are mounted from an underside 31 of the front axle support 4 in the z direction of the coordinate system shown here to an upper-side region 23 of the front axle support 4 by fixing a common fitting, not shown here, for a steering gear and for a front axle stabilizer. For the common fitting only one through hole 13 is provided for the mounting of the steering gear and the front axle stabilizer. Another through hole 24 is merely provided for further fixing of the front axle stabilizer on the upper-side area 23.

Figure 2:
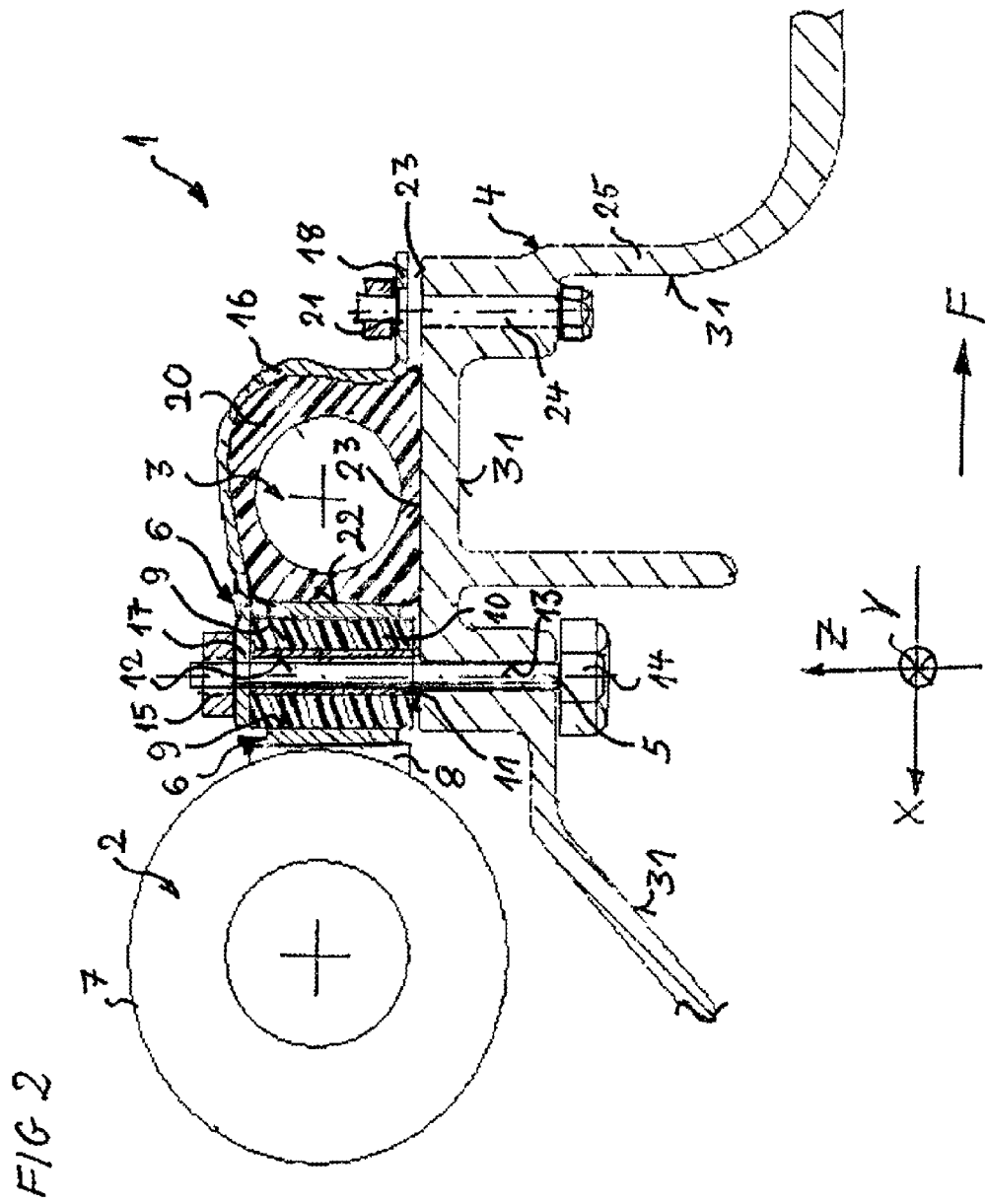
FIG. 2 shows a schematic cross-section through a front axle support with an arrangement of a steering gear and a front axle stabilizer according to one embodiment.

A front axle support 4 having an arrangement 1 of a steering gear 2 and a front axle stabilizer 3 according to one embodiment is shown by a schematic cross-section in FIG. 2, where the steering gear 2 with its casing 7 is depicted as circular and is mounted in such a manner on a common fitting 6 on the front axle support 4 that the front axle support 4 can absorb steering forces which act in the direction of the y axis. Since only one screw connection 5 for the steering gear 2 and a front axle stabilizer 3 is provided here, the steering gear 2 must be prevented from being able to twist about the single axis of the screw connection 5 due to steering forces acting on the steering gear 2 transversely to the direction of travel.

Such twisting can be prevented by the common fitting 6 that is disposed on a fastening flange 8 of the casing 7 of the steering gear 2 having a flat outer edge 22, on which the front axle stabilizer 3 is aligned in a stabilizing manner so that as a result of the resilience of a first elastomer element 10 disposed in a through opening 9 of the common fitting 6, a limited decoupling of vibrations is accomplished. However twisting about the axis of a stress bolt 14 is not possible.

Due to the first elastomer element 10, the steering gear 2 is therefore mechanically connected via the fastening flange 8 to a second elastomer element 20 of the front axle stabilizer 3 but the transmission of vibrations, oscillations, or abrupt movements is suppressed by the first elastomer element 10 and the second elastomer element 20. The arrangement 1 is supported by a metal sleeve 11 which is disposed inside the first elastomer element 10 and forms a first through hole 12 for a stress bolt 14. The stress bolt 14 is disposed in the second through hole 13 of the front axle support 4 and is guided through both through holes 12 and 13.

The metal sleeve 11 is pressed in a stabilizing manner onto the upper side region 23 of the front axle support 4 by the stress bolt 14. In this case, the first through hole 12 through the metal sleeve 11 is provided with a larger inside diameter than the second hole 13 through the front axle support 4. The first through hole through the metal sleeve 11 having the larger inside diameter is covered by a first end 17 of a clip 16, where the first end 17 of the clip 16 is configured as a cover disk and this cover disk presses the metal sleeve with the aid of the stress bolt 14 onto the upper-side region 23 of the front axle support 4.

The clip 16 partially surrounds the cross-section of the front axle stabilizer 3, which is completely surrounded by the second elastomer element 20 so that here also a vibration damping between front axle stabilizer 3 and front axle support 4 is dampened. The second end 18 of the clip 16 is bent in such a manner that it is detachably connected to the front axle support 4 with the aid of a hole 21 in the clip 16 and via a through hole 24 in the front axle support 4. In this case, the second elastomer element 20 is compressed in such a manner that on the one hand it rests against a flat outer edge 22 of the common fitting 6 and on the other hand is pressed on the upper-side region 23 of the front axle support 4.

FIG. 2 shows that due to the common fitting 6 which is cast as a fastening flange 8 onto the casing 7 of the steering gear 2, a single stress bolt in cooperation with the clip 16 described above is sufficient in order to fix the steering gear 2 and the front axle stabilizer 3 at or on the front axle support 4. To this end, as shown in FIG. 1 and FIG. 2, the front axle support 4 can be formed from an aluminum die cast part 25.

A front axle support 4 with an arrangement 30 of a steering gear 2 and a front axle stabilizer 3 according to a further embodiment is shown in cross-section in FIG. 3, where components having the same functions as in the preceding figures are identified with the same reference numbers and not discussed additionally. The difference from the first embodiment consists in that a threaded attachment 15 of the stress bolt 14 cooperates with a cage nut 19, where the cage nut 9 is a part of the first end 17 of the clip 16. Similarly, a further cage nut 26 can be located on the second end 18 of the clip 16 in order here also to facilitate the fixing of the clip 16 on the front axle support 4 from the underside 31 thereof.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A front axle support, comprising:
   a steering gear comprising a casing with a fastening flange, the fastening flange including a through opening in which a first elastomer element is disposed;
   a front axle stabilizer;
   a plurality of receptacles configured to fasten the steering gear and further configured to fasten the front axle stabilizer with screw connections;
   a common fitting on which the steering gear and the front axle stabilizer are fixedly disposed with a common screw connection on the front axle support, the fastening flange configured to form the common fitting so that steering forces of the steering gear act in a y-direction transverse to a direction of travel via the common fitting on the front axle support; and
   a clip connected detachably to the common fitting that partially surrounds the front axle stabilizer,
   wherein a metal sleeve with a first through hole is disposed in the first elastomer element, which is aligned onto a second through hole in the front axle support,
   wherein the clip has a first end and a second end, and
   wherein the first end of the clip is formed as a cover disk.

2. The front axle support according to claim 1, wherein the common fitting with the fastening flange is configured to form a cast-on part of the casing of the steering gear.

3. The front axle support according to claim 1, wherein a first inside diameter of the first through hole of the metal sleeve is greater than a second inside diameter of the second through hole in the front axle support.

4. The front axle support according to claim 1, wherein the first end is configured to cover the first through hole of the metal sleeve.

5. The front axle support according to claim 1, wherein the first end of the clip with a stress bolt secures a press fit of the metal sleeve of the first elastomer element with the first through hole on the front axle support.

6. The front axle support according to claim 1, wherein the first end comprises a cage nut on the cover disk that engages with a stress bolt.

7. The front axle support according to claim 1, wherein at a second end, the clip comprises a hole by which the second end of the clip is fixed on the front axle support via a screw connection between the second end of the clip and the front axle support.

8. The front axle support according to claim 1, wherein a stress bolt is guided through the first through hole and the second through hole.

9. The front axle support according to claim 8, wherein an inside diameter of the second through hole is adapted to an outside diameter of a threaded attachment of the stress bolt.

10. The front axle support according to claim 1, further comprising a second elastomer element disposed between the clip and the front axle stabilizer, the second elastomer element completely surrounds a cross-section of the front axle stabilizer.

11. The front axle support according to claim 10,
   wherein the second elastomer element of the front axle stabilizer is clamped between an outer edge of the common fitting, an upper side region of the front axle support, and the clip, and
   wherein the clip secures the front axle stabilizer on the front axle support against displacement by vertical forces in a z-direction.

* * * * *